PNEUMATIC COMPACTION OF ASPHALT COMPOSITIONS

Original Filed Aug. 13, 1965 2 Sheets-Sheet 1

INVENTORS
RICHARD L. FERM
ROBERT J. SCHMIDT
BY F. C. Johnston
B. D. Rowland
ATTORNEYS

PNEUMATIC COMPACTION OF ASPHALT COMPOSITIONS

Original Filed Aug. 13, 1965 2 Sheets-Sheet 2

INVENTORS
RICHARD L. FERM
ROBERT J. SCHMIDT
BY P. C. Johnston
B. J. Rowland
ATTORNEYS United States Patent Office Re. 26,675
Reissued Sept. 30, 1969

26,675

PNEUMATIC COMPACTION OF ASPHALT COMPOSITIONS

Richard L. Ferm, Lafayette, and Robert J. Schmidt, El Cerrito, Calif., assignors to Chevron Research Company, San Francisco, Calif., a corporation of Delaware Original No. 3,344,721, dated Oct. 3, 1967, Ser. No. 479,521, Aug. 13, 1965. Application for reissue Oct. 10, 1968, Ser. No. 771,677

Int. Cl. E01c *19/26, 21/00*

U.S. Cl. 94—22 14 Claims

Matter enclosed in heavy brackets [ ] appears in the original patent but forms no part of this reissue specification; matter printed in italics indicates the additions made by reissue.

ABSTRACT OF THE DISCLOSURE

A method and apparatus for pneumatically compacting asphalt concrete at temperatures of the asphalt concrete composition in excess of 180° F., which comprises [spraying onto] *applying to* the rubber pneumatic compacting wheels a dilute unstable oil-in-water emulsion.

This invention concerns a novel method for compacting and rolling asphaltic composition roadbeds, the compositions used therein and an apparatus which employs the method of this invention particularly advantageously.

A common material used for paving is asphalt concrete. Asphalt concrete is primarily a mixture of rock aggregate of varying size bound together by a bituminous binder. When paving the asphalt concrete, it is necessary to compact the composition to remove most of the air pockets trapped in the composition. These air pockets are referred to as voids. It is generally believed that from about 4 to 5 percent voids provides the most desirable properties for a pavement. This degree of voids is sufficiently low to minimize aging and weathering of the asphalt, while still permitting the desirable mechanical properties of rock-to-rock contact in the roadway.

In order to obtain the low degree of voids, it is necessary to efficiently compact the asphalt concrete composition laid down. Satisfactory compaction is best achieved with pneumatic compactors, but in order for pneumatic compactors to be efficient, the asphalt concrete composition must have a reasonable degree of fluidity. Best compaction results are therefore achieved with the asphalt concrete at relatively high temperatures, temperatures above 180° F. and generally of about 225° to 300° F. At lower temperatures, the asphalt concrete composition is not fluid enough to permit efficient compaction.

Unfortunately at temperatures above 180° F., the asphalt binder sticks to the pneumatic tires, tearing up the road and creating irregularities. Therefore, in the past it has been necessary to compact the roadbed at relatively low temperatures at which compaction by pneumatic tires is inefficient and becomes relatively expensive because repeated rollings are necessary.

Pursuant to this invention, a dilute moderately unstable oil-in-water emulsion is sprayed onto the pneumatic compactors while rolling the asphalt concrete pavement at temperatures above 180° F., preventing the sticking and adhering of the asphalt concrete to the pneumatic tires. In combination with this method is an apparatus which employs pneumatic tires forwardly to compact the asphalt concrete composition and a steel roller rearwardly to smooth out the compacted roadway and add a further degree of compaction.

The method of this invention can be used with any pneumatic compactor and as indicated is particularly advantageous at relatively high temperatures, i.e., above 180° F. By combining the present method with an apparatus which combines pneumatic tires as pneumatic compactors and a steel roller, an apparatus is provided which can efficiently and easily be used on relatively small jobs or jobs requiring an apparatus with easy mobility and maneuverability. The apparatus is described in the accompanying drawings.

Figure 2:
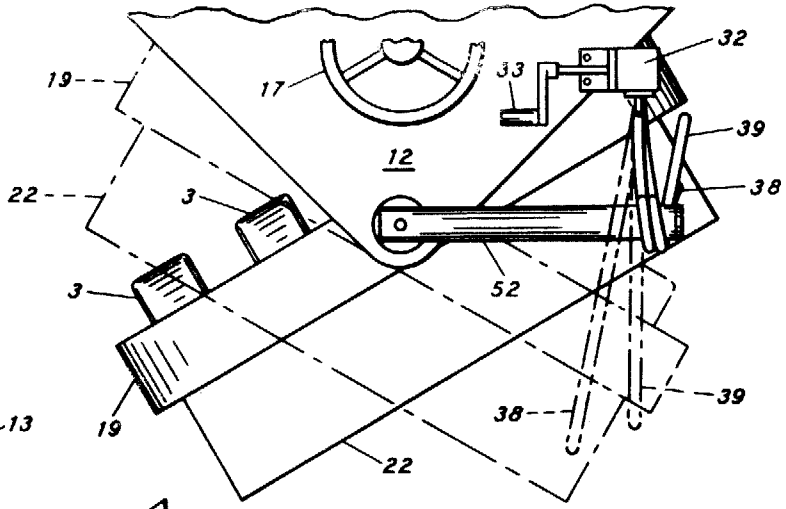
FIG. 2 is a partial plan view omitting numerous parts in the interest of clearness, and indicating the yoke in two different turned positions.
Figure 1:
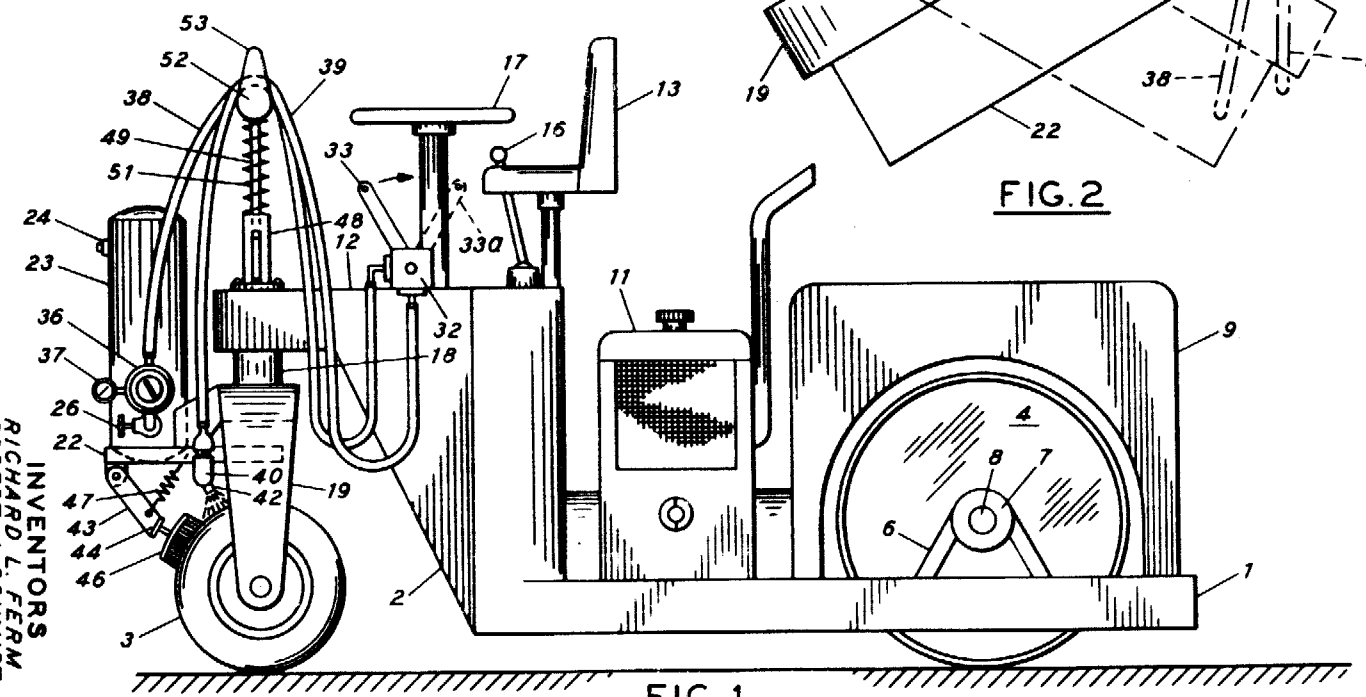
FIG. 1 is a side elevational view of the pneumatic compactor and roller of this invention.
Figure 3:
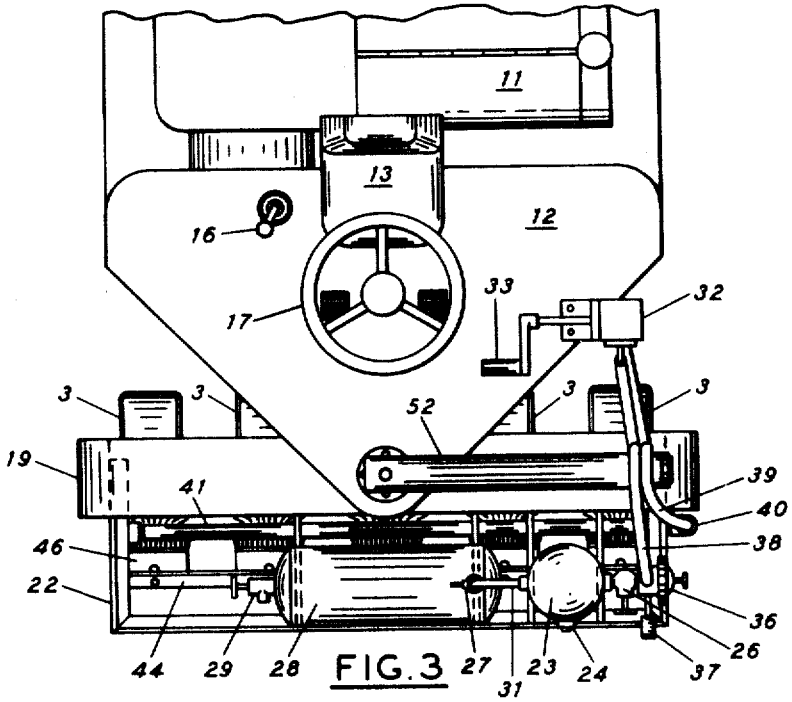
FIG. 3 is a partial plan view looking downward on the forward portion of the apparatus.
Figure 4:
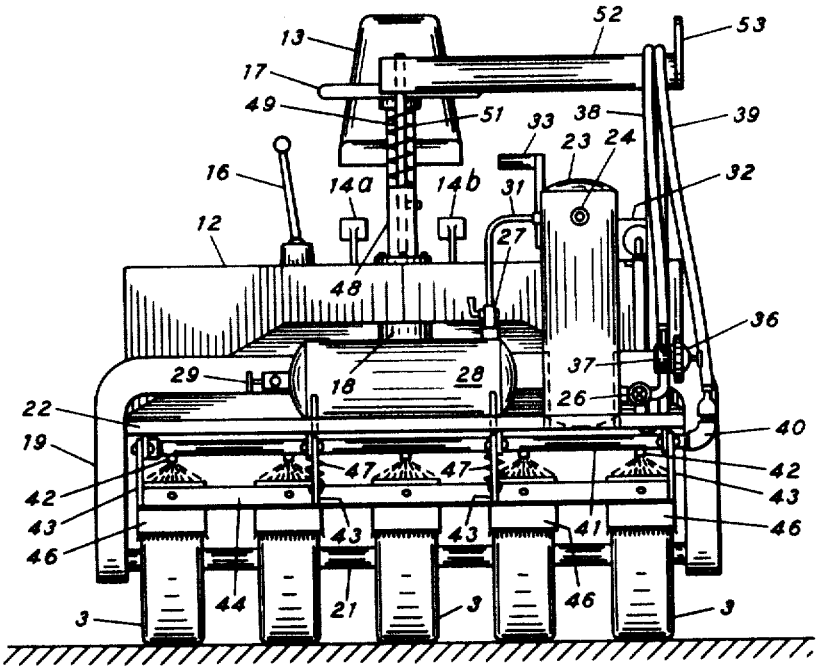
FIG. 4 is a front elevation view.

The combined pneumatic compactor and road roller vehicle of our invention comprises a main frame part, part of which is seen as a longitudinally extending side member 1 and platform support 2, supporting the forward portion of the frame, a plurality of pneumatic tires 3 mounted in a yoke pivotably connected to said frame, an emulsion applicator to maintain a thin film of dilute oil-in-water emulsion on the face of the pneumatic tires, and a steel driving roller 4 powered to provide propulsion for the vehicle supporting the rear portion of said frame.

The portion of the frame comprising the longitudinally extending side member 1 is supported in the rear through struts 6 connected to the bearing 7 in which the steel roller axle 8 is journaled. The steel roller or rear axle 8 is rigidly connected to the steel drive roller 4 which engages the roadway. A cover 9 is provided for the steel roller. A diesel engine 11 is mounted on the frame and operatively connected to the steel roller 4 (the particular means not being represented) providing the propulsion means for the vehicle.

Forwardly of the frame is a platform 12 upon which is mounted a driver seat 13, various pedals **14*a* and 14*b* and a lever 16 for controlling the movement of the vehicle, as well as a tiller wheel operably connected to the yoke 19** (the connecting means is not represented) to turn the yoke, which provides the means for maneuvering the vehicle.

Pivotally mounted in the forward section of the frame platform 12 is a vertical shaft 18 rigidly connected to the center of the yoke 19. Pneumatic tires 3, engaging the roadway, are rigidly mounted in a front axle 21 relatively evenly spaced about one tire width apart. The axle 21 is rotatably mounted in the yoke. Connected to the yoke 19 is an auxiliary frame 22 positioned above the pneumatic tires.

To spray the dilute oil-in-water emulsion on the pneumatic tires 3, the emulsion reservoir 23 mounted on the auxiliary frame 22 is filed through an upper port 24 with the emulsion. The exit valve 26 and the valve 27 between the emulsion reservoir 23 and the pressure reservoir 28 are closed and the pressure reservoir 28 is then pressurized through the open gas intake valve 29. When the pressure reservoir 28 is filled, the intake valve 29 is closed, the valve between the reservoirs 27 is opened and the gas is fed into the emulsion reservoir 23 through the connecting conduit 31 applying pressure against the emulsion.

An open-close valve 32 is provided near the driver and the lever control 33 is pictured in the normally open position. The dotted lines 33*a* indicate the closed position. The reservoir exit valve 26 is opened and the pressure of the emulsion set with the diaphragm valve 36, reading the pressure on the gauge 37.

When the vehicle is ready to move, the driver moves the lever control 33 to the open position and the emulsion then flows through the conduit 38 to the open-close valve 32 and then through a second conduit 39 to the fitting 40 which is connected to the rigidly mounted manifold 41.

A plurality of nozzles 42 equal to the number of tires is mounted in the manifold and positioned above the tires to spray downwardly onto the tire face.

Suspended from the auxiliary frame 22 by connecting members 43 having pivotal connection to the auxiliary frame 22 is a bar 44 on which are mounted mats or wipes 46. These mats engage the face of the tires 3 below the nozzles when the vehicle is traveling in the forward direction. They spread the emulsion evenly across the face of the tires and remove fortuitous minor bits of asphalt and aggregate which may have adhered to the tires 3. Springs 47 are positioned at opposite ends of the auxiliary frame 22 connected from the auxiliary frame 22 to connecting members 43 and maintain a mild tension on the bar 44 to keep the wipers 46 in contact with the faces of the tires 3. The wipers 46 may be moved out of engagement with the tire face, by disengaging the springs 47 and raising the bar 44 pivoting around the connection to the frame 22. Thus replacement or repair of the wipers may be easily performed.

The steering mechanism for the vehicle (except for the steering wheel and shaft, this mechanism is not represented) turns the yoke 19 in the direction the vehicle is to go. In FIG. 2, the position of the yoke 19 when turning to the left, is indicated by the solid lines, to the right by the broken lines. As the yoke turns, the conduits 38 and 39 are extended or retracted. A telescoping device is provided to support the conduits and take up any slack. Mounted on the platform 12 is a tubular member 48; a second shaft 49 is fitted telescopically with the tubular member. A spring 51 extends from the lip of the tubular member 48 to an arm 52, the arm 52 being rigidly connected at one end to the shaft 49, and has sufficient tension to maintain the shaft 49 in the extended position when the weight of the filled conduits 38 and 39 is pressing down on the arm 52, but contracts when additional pressure is applied by extending the conduits. The shaft 49 is slotted in the tubular member 48 to prevent rotation. A shoulder 53 is provided on the end of the arm 52 opposite the end connected to the shaft 49 to prevent the conduits from slipping off.

The vehicle will generally have a total weight from about 0.25 to 5 tons, usually about 1 to 5 tons. The pneumatic tires will generally have diameters of from about 24 to 48" and face widths of about 4 to 16". The distance from the outermost edges of the most distant tires will be slightly less than the width of the steel roller. The pressure in the tires will usually vary from about 20 p.s.i. or 120 p.s.i. with the loading per tire being in the range of about 500 to 1,000 lbs.; about 4 to 6 tires will be used. The tires will normally be from about ½ to ⅓ the diameter of the steel roller.

The steel roller will vary from about 18 to 66" in diameter and about 30 to 34" wide. The loading will be about 100 lbs. to 600 lbs. per lineal inch.

The apparatus of this invention which employs front pneumatic tires for compaction sprayed with the anti-sticking emulsions of this invention and a rear steel roller permits the manufacture and use of relatively light weight machines which are extremely mobile and can be used for jobs which are either relatively small or require a significant degree of maneuverability. The great efficiency in obtaining improved roadways or asphalt concrete composition pavements by obtaining the desired degree of compaction and percentage of voids is possible because the pneumatic tires are able to operate at relatively high temperatures at which satisfactory compaction is achieved and the steel roller further enhances the compaction and smoothes out the pavement. Thus with one maneuverable vehicle of relatively low weight, high compaction is achieved and a smooth, dense, long-wearing surface is obtained. Heretofore, for small jobs or in those situations where only small apparatuses could be used, compaction was not efficiently done and only relatively short-lived pavements could be obtained.

Moreover, it was previously found that with asphalt-concrete pavements at high temperatures, i.e., above 180° F., the steel roller created a wave in front of the roller in the direction of travel. Rather than compacting the surface, decompaction occurred. In the subject apparatus, with the pneumatic tires initially compacting the asphalt-concrete pavement, the weight of the vehicle is distributed over a much wider area than with a steel roller, avoiding decompaction and providing good compaction; the steel roller then serves to roll the surface smooth with further enhancement of the compaction.

While the dilute aqueous oil-in-water emulsions of this invention find particular advantage with the aforedescribed apparatus, the emulsions of this invention can be used with any road rolling apparatus employing pneumatic tires or in fact in any situation where hot asphalt comes in contact with rubber or similar material and the hot asphalt then has to be removed from the rubber, e.g., rubber conveyors in hot asphalt mix plants.

While in the above apparatus spraying was used in applying the emulsion—spraying is found to be the most efficient way of applying the emulsion, particularly as measured by the amount of material expended—any other means may also be used which provides a continuous even flow of the emulsion to the pneumatic tire face. Gravity flow is satisfactory, trickling the emulsion onto the pneumatic tire face, except when the apparatus is operating on an incline; in this situation, the tires on the upward portion of the incline are not likely to receive any of the emulsion. Numerous devices have been patented for feeding liquids evenly over steel rollers and these can generally be adapted to be used with pneumatic tires to provide a continual even stream of emulsion onto the tire faces.

In order to insure an even distribution of the emulsion on the pneumatic tire face, generally, some type of wiper will be used. The wiper also serves to remove any small bits of adventitious asphalt or aggregate which may have stuck to the tire face. Most commonly, a mat or coco mat will be used and these have found extensive employment, particularly with the very inefficient use of water to prevent sticking of the asphalt binder to the pneumatic tires.

The aqueous emulsion will be continuously applied to the pneumatic tire's face as the compacting apparatus rides over the hot asphalt concrete surface. The amount of the emulsion which is applied is not critical to this invention, depending on a variety of variables: field conditions, the particular emulsion used, the temperature at which pneumatic compaction is occurring, etc. Generally, about 1 gallon per hour per pneumatic tire will be used, and usually, less than 15 gallons per hour per tire will be required when the apparatus is in continuous use. Frequently, from about 3 to 8 gallons per hour per tire will suffice. However, the particular rate of application can be readily determined in the field by observing the minimum rate required to minimize or avoid the adherence of the asphalt binder.

The emulsions of this invention can be used with various asphalt containing paving compositions. The emulsions are particularly useful with asphalt concrete, especially when the asphalt concrete is pneumatically compacted at temperatures above 180° F., usually from about 200° F. to 300° F. In those instances where sticking is a problem with steel rollers, the emulsions used in this invention may also find use. It is also found that with asphalts containing polymeric additives, e.g., rubber asphalt sticking becomes a problem which can be alleviated by the application of the emulsions described in this invention to either the rubber or steel rollers or both. Therefore, while the emulsions of this invention find particular use with asphalt concrete at elevated temperatures, they may also be used with advantage when paving asphalt compositions under a variety of other conditions. As already indicated, other uses for the emulsions can also be readily found when asphalt adherence to rubber or similar material becomes a significant problem.

The dilute oil-in-water emulsion of this invention is comprised of water, a hydrocarbonaceous liquid, referred to as oil, and an emulsifier. Other additives may also be included as desired or needed. The oil will generally be present in amount of at least about 0.5 weight percent and may be as high as 20 weight percent, usually not more than 10 weight percent, depending on the desired use. For use with asphalt concrete paving, the composition usually will have from about 1 to 5 weight percent of oil. The emulsifier will be present in from about 0.1 to 15 weight percent based on the oil, preferably from about 0.5 to 5 weight percent based on the oil. The remainder of the composition is water and other additives. The water, therefore, will be present in an amount of from 85 to 99 weight percent, more usually 90 to 99 weight percent based on the amount of oil and other additives.

Initially, the oil-in-water emulsion may be prepared as a concentrate and diluted prior to use. The concentrates will have from about 50 to 75 weight percent of oil.

The oil or hydrocarbonaceous liquid as a practical matter will have a boiling point of at least about 200° F. The boiling point is one of convenience based on a minimum volatility in order to permit sufficient oil to remain on the hot pneumatic tire and yet sufficient volatility that, at least slowly, the oil will evaporate from the surface of the pavement. Too great a volatility will require large amounts of the hydrocarbonaceous fluid, while too low a volatility will permit the oil to remain for an indefinite time in the pavement resulting in the softening of the pavement. While this is not a serious problem in view of the very dilute character of the emulsion, in instances where the operator of the roller, while the roller is standing still, allows the emulsion to continue to run for a long period of time, large puddles may form and appreciable amounts of oil may be absorbed by the pavement. However, this is anticipating an extreme situation which generally need not govern the type of oil used. In most instances, the maximum boiling point will be below about 1,000° F., more usually below about 850° F. Preferably, the boiling point range will be from about 300° to 850° F. That is, any hydrocarbonaceous fluid used would have at least about 50 weight percent of the mixture boiling in the indicated range.

Preferably, the hydrocarbonaceous liquid or oil will not be too viscous. By too viscous is meant a viscosity at 210° F. of greater than about 100 seconds, Saybolt Universal (SSU). Preferably, the oil will have a viscosity of less than about 60 SSU at 210° F.

The oil may be either aliphatic, aromatic, alicyclic or combinations thereof. While any of these hydrocarbon types are useful for preventing sticking of the asphalt to the pneumatic roller, it is found that aromatic hydrocarbons attack the rubber and reduce the useful life of the pneumatic rubber roller. To that extent, hydrocarbons free of aromatic unsaturation, particularly paraffinic hydrocarbons are preferred. By paraffinic hydrocarbons is intended predominantly paraffinic and is not intended to exclude mixtures which contain minor amounts of aromatic hydrocarbons.

Illustrative hydrocarbons which are readily available are diesel fuels: broad range, heavy and light, boiling, respectively, in the range of 325°–650° F., 550°–650° F., and 325°–550° F., pale oils, neutral oils, thinners, particularly paraffinic thinners, etc. As evidenced by the above examples, for the most part, mixtures of hydrocarbons will be used because they are inexpensive and readily available.

The emusifiers which are used may be anionic, cationic or nonionic. The emusifiers are described in Kirk-Othmer, Encyclopedia of Chemical Technology, volume 5, Interscience Encyclopedia Incorporated, New York (1950), page 701 ff. While the emusifiers used in this invention may be of any type, i.e., anionic, cationic or nonionic, it is necessary that in any partition between water and oil (hydrocarbon liquid), the emulsifier be predominantly soluble in the water. That is, more of the emulsifier will be dissolved in the water than in the oil. The emulsifiers fulfilling this requirement will be referred to as hydrophilic.

The partition can be readily determined by shaking a sample of the emulsifier with equal volumes of water and oil, separating the resulting phases and analyzing the concentration of emulsifier in each phase.

The various emulsifiers may be used in individually or in combination. Of course, an anionic emulsifier may not be used with a cationic emulsifier. Illustrative of various emulsifiers are polyoxyethylene sorbitan monopalmitate, tallow trimethyl ammonium chloride, alkyl alkylamino imidazolines, ethoxylated and polyethoxylated dodecanyl phenol, acid salts of tallow 1,3-propylene diamine, polyethoxylated quaternary ammonium halides, polyethoxylated fatty amines and their salts, alkylbenzene sulfonate alkali metal salts, etc. The preferred emulsifiers are the cationic emusifiers such as the alkyl ammonium salts.

Generally, the emulsion is prepared as a concentrate having from about 50 to 75 weight percent oil and from 0.1 to 15 weight percent of emulsifier based on the weight of oil, usually 0.5 to 5 weight percent. The amount of emulsifier will be governed by the stability of the emulsion. The emulsifier concentration should provide an emulsion of only limited stability. That is, the emulsion on being sprayed onto the tires collapses and provides a protective film on the tire face.

The emulsion is prepared by mixing its various constituents under high shear conditions, e.g., a colloid mill. Other methods include the use of Charlotte mills, centrifugal pumps, Manton-Gaulin homogenizer or paint mills. Methods of preparing emulsions by using high shear conditions are well known in the art and do not require extensive exemplification here. The particular apparatus which is used to provide the high shear conditions is not critical to this invention. For the most part, the hydrocarbonaceous particles will be less than about 6$\mu$ median diameter, preferably 4$\mu$ median diameter.

Other additives may also be included in the emulsion. Additives include emulsion stabilizers, e.g., carboxymethyl cellulose, odorant to mask offensive odors, e.g., new mown hay, Deodall brand deodorants, etc. The amount of the individual additives will generally range from about 0.01 to 0.5 weight percent of the total composition.

As already indicated, the emulsions may be used with any pneumatic compacting device. The pneumatic rollers or tires may be mounted on self-propelled vehicles by themselves or in combination with steel rollers or on trailers. The size of the tires will generally be from about 24" to 72" in diameter and from about 5" to 15" in width. For compacting the relatively soft surface of bituminous compositions at temperatures above 180° F., the tires will be pressurized to about 20 to 120 p.s.i. and provide a pressure against the pavement surface of from about 20 to 120 lbs./sq. in. The loading per tire will vary from about 500 to 2,000 lbs.

In order to demonstrate the effectiveness of the dilute oil-in-water emulsions, a 5 ton Bros pneumatic roller was used. This roller was equipped with 9 wheels in all, 5 on one end and 4 on the other. The tires were 30" in diameter, 8" in width and pressurized to 40 p.s.i. The modified pneumatic roller used for this work had a weight of 10,370 lbs., giving an average of 1,152 lbs. on each of the 9 tires.

The vehicle was equipped with a spray system that permitted 5 different materials to be individually applied simultaneously to either a single or a pair of the tires. Five individual small blow cases (approximately 8.5 gallons each) were pressured through a reducing valve from a nitrogen cylinder. Each of the materials being tested was led from the respective blow case through tubing to small spray nozzles positioned to spray fully across the face of each tire at a rate of 3 gallons per hour per tire. Individually spring loaded coco mats wiped each tire. These mats were adjustable and could be raised out of contact with the tire if desired.

Various emulsions were prepared by varying the hydrocarbonaceous fluid and emulsifier. The different emulsions were introduced into the blow cases and applied to the pneumatic rollers. The following table indicates the compositions of the various emulsions, the maximum temperature of rolling attempted without significant adherence to the pneumatic tires, whether coco mats were used, and compares these results with those obtained with other materials.

TABLE I

| Hydrocarbon [1] | Weight Percent [2] | Emulsifier [3] | Weight Percent [4] | Maximum Temperature of Rolling, ° F. | | |
|---|---|---|---|---|---|---|
| | | | | Intermittent Without Coco Mats | Sustained With Coco Mats | Intermittent With Coco Mats |
| | | | | | 150–170 | |
| | | Nalcamine G39M | 1 | | 150–170 | |
| | | Arquad T | 1 | | 180–200 | |
| | | F-38 | 1 | | 180–200 | |
| A | 2 | Arquad T | 0.5 | >250 | 260–275 | >300 |
| A | 2 | Nalcamine G39M | 1 | >220 | 260–275 | |
| A | 2 | NIW | 1 | | >250 | |
| B | 2 | Arquad T | 0.5 | >220 | 260–275 | >300 |
| B | 2 | Nalcamine G39M | 1 | | 260–275 | |
| C | 2 | Arquad T | 0.5 | | 260–275 | >300 |
| D | 2 | Arquad T | 0.5 | | 260–275 | >300 |
| E | 2 | Arquad T | 0.5 | | 260–275 | >300 |
| A | 2 | ABS | 1 | [5] >220 | | |
| A | 2 | Tall oil acid tri-ethanol amine salt. | 1 | [5] >220 | | |
| C | 2 | Nalcamine G39M | 1 | [5] >250 | | |
| A | 2 | Span 40 | 1 | | [5] >250 | |
| | | Tween 41 | 1 | | | |
| A | 2 | Span 40 | 0.5 | | [5] >250 | |
| | | Tween 40 | 1 | | | |
| A | 1 | Arquad T | 1 | | [5] >230 | |
| F | 2 | Arquad T | 1 | | [5] >250 | |
| G | 2 | Arquad T | 1 | | [5] >250 | |

[1] A—Diesel fuel; boiling range, 350°–675° F.; $V_{100}$=35–410 SSU ($V_{100}$=Viscosity at 100° F.) (Seconds, Saybolt Universal).
B—Predominantly aliphatic thinner; boiling range, 314°–396° F.; $V_{100}$=1.05 cs. (centistokes).
C—Predominantly aromatic thinner; boiling range, 360°–414° F.; $V_{100}$=1.05 cs.
D—Predominantly aliphatic thinner; boiling range, 318°–389° F.
E—Predominantly aliphatic thinner; boiling range, 346°–392° F.; $V_{100}$=1.44 cs.
F—Pale oil; $V_{100}$=100–110 SSU.
G—Neutral oil; $V_{100}$=480 SSU.
[2] Weight present hydrocarbon fluid in final emulsion as diluted for use in pneumatic roller.
[3] Nalcamine G39M—Imidazoline product from tall oil and diethylene triamine, hydrochloride salt.
Arquad T—Tallowtrimethylamminonium chloride.
F-38—Copolymer of ethylene and propylene oxides.
NIW—Ethoxylated dodecenylphenol.
ABS—Alkylbenzene sulfonic acid (alkyl of from 12–15 carbon atoms), potassium salt.
Span 40—Sorbitan monopalmitate.
Tween 40—Polyoxyethylene sorbitan monopalmitate.
[4] Weight percent of emulsifier in original concentrate containing 65 weight percent of hydrocarbon.
[5] Size and temperature of pavements available did not permit sustained maximum temperature to be established.

TABLE II.—EMULSION COMPOSITION

| Emulsifier [1] used with 65 weight percent diesel fuel: | [2] Weight percent |
|---|---|
| A | 0.5 |
| A | 1 |
| A | 2 |
| A | 3 |
| A | 5 |
| B | 5 |
| C, D | 1, 0.1 |
| C, E | 1, 0.1 |
| C, F | 1, 0.17 |
| G | 2 |
| B, H | 1, 0.1 |
| B, I | 1, 0.1 |

[1] See the following designations:
A—Sodium alkylaryl sulfonate (90% active) (Pilot Chemical Co.), Pilot HD-90.
B—Alkylphenol polyoxyethylene, Oronite NIW.
C—Tallowtrimethylamino chloride (50% in aqueous isopropanol) (Armour), Arquad T-50.
D—Methoxyl hydroxypropyl cellulose (Dow Chemical Co.), Methocel HG.
E—Ethylene oxide polymer (Union Carbide, Chemicals Div.), Polyox WSR-205.
F—Partially acetylated polyvinyl alcohol (Cotton Chemical Co.), Vinol PA-40.
G—Agrimul S (Nopco) (an aromatic sulfonate ethylene oxide condensate blend).
H—Sodium carboxymethyl cellulose, Hercules CMCHP.
I—[Poly(methylvinylether/maleic anhydride)] (Gen'l Aniline & Film Corp., Dyestuff & Chem. Div.), Gantrez 169.

[2] Based on weight of oil.

Emulsions coming within the scope of this invention were subjected to further vigorous testing. Using the equipment and method described above under extremely hot climatic conditions, various emulsions were tested up to 250° F. for preventing adherence to the pneumatic tires. Table II indicates the emulsions tested with success.

Tests were also made as previously described, varying the amount of emulsifier and diesel fuel to determine the effect of varying concentration on preventing asphalt adherence. The rolling was performed at 250°–260° F. and the following Table III indicates compositions which were found to be effective.

TABLE III.—ANTISTICKING EMULSION COMPOSITIONS

| Weight Percent Diesel Fuel | Weight Percent Arquad T-50 | Cellosize [1] QP 15000 |
|---|---|---|
| 65.00 | 2.00 | -------- |
| 65.00 | 2.00 | 0.10 |
| 75.00 | 2.00 | -------- |

[1] Stabilizer (form of hydroxyethyl cellulose) supplied by Union Carbide and Chemicals Co.

It is evident from the above table that by use of the process of this invention employing the disclosed emulsions, numerous advantages are obtained in the pneumatic compacting of asphalt concrete as well as other asphalt containing paving compositions. Particularly, superior compaction is obtainable because compaction may be carried out at higher temperatures, permitting optimization of the desirably low percentage of voids. Furthermore, the rolling may more closely follow the laying of the asphalt concrete, since rolling need not await cooling of the asphalt concrete to a temperature at which sticking will not occur in the absence of the emulsions disclosed in this invention. Furthermore, the aqueous emulsions provide an inexpensive and efficient way to operate pneumatic compaction at elevated temperatures to provide superior pavements.

The apparatus of this invention provides a maneuverable, relatively light weight compacting and rolling vehicle which provides the desired compaction for durable, long-lived asphalt-concrete pavements.

As will be evident to those skilled in the art, various modifications on this invention can be made or followed, in the light of the foregoing disclosure and discussion, without departing from the spirit or scope of the disclosure or from the scope of the following claims.

We claim:

1. A method for efficiently compacting and rolling bituminous pavement compositions at temperatures in excess of 180° F., which comprises compacting the pavement with a plurality of pneumatic tires while spraying onto the faces of said pneumatic tires at a sufficient rate to prevent adhesion of the bituminous pavement composition to said pneumatic tires an oil-in-water emulsion comprising from 0.5 to 10 weight percent of a hydrocarbonaceous fluid boiling in the range of about 200° F. to 1000° F. and having a viscosity at 210° F. of less than about 100 SSU, from 0.1 to 15 weight percent based on the weight of said hydrocarbonaceous fluid of a hydrophilic emulsifier and water.

2. A method according to claim 1 wherein said hydrocarbonaceous fluid is present in an amount of from 1 to 5 weight percent of said composition.

3. A method according to claim 1 wherein said hydrocarbonaceous fluid is present in an amount of from about 1 to 5 weight percent of said composition and is diesel fuel boiling in the range of 325° to 650° F.

4. A method according to claim 1 wherein said hydrocarbonaceous fluid is primarily paraffinic and is present in an amount of from about 1 to 5 weight percent based on said composition, said emulsifier is cationic and present in an amount of from about 0.5 to 5 weight percent based on said hydrocarbonaceous fluid and the rate of application of said emulsion to said pneumatic tire face is from about 1 to 15 gallons per hour of use per tire.

5. A method for efficiently compacting and rolling bituminous pavement compositions at temperatures in excess of 200° F., which comprises compacting the pavement with a plurality of pneumatic tires while spraying onto the faces of said pneumatic tires at a sufficient rate to prevent adhesion of the bituminous pavement composition to said pneumatic tires an oil-in-water emulsion comprising from 0.5 to 10 weight percent of a primarily paraffinic diesel fuel boiling in the range of about 325° to 650° F. and from 0.1 to 15 weight percent based on the weight of said diesel fuel a hydrophilic emulsifier and water.

6. A method according to claim 5 wherein said hydrophilic emulsifier is a cationic emulsifier.

7. A method according to claim 5 wherein said diesel fuel is present in amount of from about 1 to 5 weight percent and said hydrophilic emulsifier is an ammonium emulsifier.

*8. A method for efficiently compacting and rolling bituminous pavement compositions at temperatures in excess of 180° F., which comprises compacting the pavement with a plurality of pneumatic tires while applying to the faces of said pneumatic tires at a sufficient rate to prevent adhesion of the bituminous pavement composition to said pneumatic tires an oil-in-water emulsion comprising from 0.5 to 10 weight percent of a hydrocarbonaceous fluid boiling in the range of about 200° F. to 1000° F. and having a viscosity at 210° F. of less than about 100 SSU, from 0.1 to 15 weight percent based on the weight of said hydrocarbonaceous fluid of a hydrophilic emulsifier and water.*

*9. A method according to claim 8, wherein said hydrocarbonaceous fluid is present in an amount of from 1 to 5 weight percent of said composition.*

*10. A method according to claim 8, wherein said hydrocarbonaceous fluid is present in an amount of from about 1 to 5 weight percent of said composition and is diesel fuel boiling in the range of 325° to 650° F.*

*11. A method according to claim 8, wherein said hydrocarbonaceous fluid is primarily paraffinic and is present in an amount of from about 1 to 5 weight percent based on said composition, said emulsifier is cationic and present in an amount of from about 0.5 to 5 weight percent based on said hydrocarbonaceous fluid and the rate of application of said emulsion to said pneumatic tire face is from about 1 to 15 gallons per hour of use per tire.*

*12. A method for efficiently compacting and rolling bituminous pavement compositions at temperatures in excess of 200° F., which comprises compacting the pavement with a plurality of pneumatic tires while applying to the faces of said pneumatic tires at a sufficient rate to prevent adhesion of the bituminous pavement composition to said pneumatic tires an oil-in-water emulsion comprising from 0.5 to 10 weight percent of a primarily paraffinic diesel fuel boiling in the range of about 325° to 650° F. and from 0.1 to 15 weight percent based on the weight of said diesel fuel a hydrophilic emulsifier and water.*

*13. A method according to claim 12, wherein said hydrophilic emulsifier is a cationic emulsifier.*

*14. A method according to claim 12, wherein said diesel fuel is present in amount of from about 1 to 5 weight percent and said hydrophilic emulsifier is an ammonium emulsifier.*

References Cited

The following references, cited by the Examiner, are of record in the patented file of this patent or the original patent.

UNITED STATES PATENTS

| | | | |
|---|---|---|---|
| 2,197,183 | 4/1940 | Keller | 94—50 |
| 2,978,967 | 4/1961 | MacDonald | 94—50 |
| 3,162,101 | 12/1964 | Rostler | 94—23 |

FOREIGN PATENTS 923,632 4/1963 Great Britain.

JACOB L. NACKENOFF, Primary Examiner

U.S. Cl. X.R.

94—50